United States Patent [19]
Smith

[11] Patent Number: 5,643,090
[45] Date of Patent: Jul. 1, 1997

[54] STRAP FOR RETAINING A BEARING CUP IN A UNIVERSAL JOINT ASSEMBLY

[75] Inventor: Johnny N. Smith, Toledo, Ohio

[73] Assignee: Dana Corporation, Toledo, Ohio

[21] Appl. No.: 578,266

[22] Filed: Dec. 26, 1995

[51] Int. Cl.$^6$ .................................................. F16D 3/40
[52] U.S. Cl. ............................... 464/130; 464/135
[58] Field of Search ........................... 464/112, 130, 464/134, 136, 905, 135; 403/344

[56] References Cited

U.S. PATENT DOCUMENTS

| | | |
|---|---|---|
| 1,327,791 | 1/1920 | Thiemer . |
| 1,362,000 | 12/1920 | Hubbard . |
| 1,789,265 | 1/1931 | Roberts . |
| 2,036,977 | 4/1936 | Anderson .................................. 464/130 |
| 2,253,300 | 8/1941 | Karlberg .................................. 464/130 |
| 2,273,920 | 2/1942 | Anderson .................................. 464/130 |
| 2,300,658 | 11/1942 | Dunn . |
| 4,881,924 | 11/1989 | Gall . |
| 4,992,076 | 2/1991 | Gille et al. .............................. 464/130 |
| 5,178,584 | 1/1993 | Cummings, III et al. . |
| 5,376,051 | 12/1994 | Valencic .................................. 464/130 |

*Primary Examiner*—Daniel P. Stodola
*Assistant Examiner*—Eileen A. Dunn
*Attorney, Agent, or Firm*—MacMillan, Sobanski & Todd

[57] ABSTRACT

A universal joint includes a pair of half round yokes, a cross member and retainer straps. The retainer straps include a main body portion and two end portions, where the end portions have retainer faces for mating with the yoke faces, where the main body portion has a curved inside retainer surface positioned between the end portions and adapted to conform to the shape of the bearing cup and to cooperate with the yoke surface to retain the bearing cup. The retainer strap has a curved outside surface which extends from one end of the retainer strap to the other to provide extra strength at the end portions of the retainer strap.

8 Claims, 2 Drawing Sheets

5,643,090

STRAP FOR RETAINING A BEARING CUP IN A UNIVERSAL JOINT ASSEMBLY

BACKGROUND OF THE INVENTION

This invention relates in general to universal joints, and in particular to an apparatus suitable for cooperating with a half round yoke to retain bearing cups in universal joints.

Universal joints are well known devices which provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly from the cross. The trunnions are oriented in a single plane and extend at right angles relative to one another, and the trunnions have a common intersection at the center of the central body portion.

A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement between the trunnions and the bearing cups. The bearing cups which are mounted on an opposed pair of the trunnions can be connected to a first end yoke secured to an end of a first drive shaft section, while the bearing cups mounted on a second opposed pair of the trunnions can be connected to a second end yoke secured to an end of a second drive shaft section.

Several different types of yokes are used in universal joints. Often the yoke is a full round yoke which is provided with a pair of opposed arms with cylindrical holes in the arms for insertion of the bearing cups. Another common type of yoke is a half round yoke, where each arm forms a curved, usually semi-circular yoke surface for receiving the bearing cup, and a retainer strap is bolted to the yoke to hold the bearing cup in place. Typically, the retainer strap for a half round yoke is provided with a curved inner surface which mimics the cylindrical contour of the bearing cup.

The performance of the retainer strap is important in the overall performance of the universal joint. The retainer strap must be strong enough to withstand the torsional and other forces associated with holding down the bearing cups of the universal joint, and yet be light weight and not bulky. Further, the retainer strap must be of very precise dimensions to assure that the bearing cup does not rotate during operation of the universal joint. A common design for retainer straps to be used with half round yokes is a generally flat plate which is curved at its midsection to conform to the shape of the bearing cup. Bolts are positioned at the end portions of the retainer strap to secure it to the yoke. A problem with conventional retainer straps is that they often exhibit metallic failure at the end portions, where they are bolted to the yoke.

Conventional flat plate retainer straps are usually made by stamping. Stamping stretches the metallic part, so that the precise fit of the bearing cup is not always possible. One known method for assuring the correct size of the opening defined by the retainer strap and the half round yoke is to bolt the retainer strip and the yoke together and mill the opening to its final tolerance. While this assures that the opening is of the correct dimensions, this method requires the extra manufacturing step of milling the opening to the final size. Also, this method creates a matched set consisting of the yoke and retainer strap, and the two parts must be used together. This method does not produce interchangeable retainer straps, and therefore manufacturing costs are increased.

It would be advantageous to provide a half round yoke retainer strap for a universal joint where the retainer strap is simple and inexpensive to manufacture, and yet provides improved strength performance.

SUMMARY OF THE INVENTION

There has now been developed a universal joint retainer strip which provides improved strength performance over traditional retainer straps while at the same time reducing manufacturing costs. The universal joint of the invention includes a first yoke, a second yoke, and a cross member. At least one of the yokes is a half round yoke having a pair of arms, with each arm adapted with a pair of legs defining a yoke surface for receiving the bearing cup of a trunnion, where each of the legs is provided with a yoke face. The half round yoke includes a retainer strap for mating with the yoke and retaining the bearing cup against the yoke surface. The retainer strap includes a main body portion and two end portions. The end portions have retainer faces for mating with the yoke faces. The main body portion has a curved inside retainer surface positioned between the end portions and adapted to conform to the shape of the bearing cup and to cooperate with the yoke surface. The retainer strap has a curved outside surface which extends from one end of the retainer strap to the other. The retainer strap and universal joint of the invention provide for a secure gripping of the bearing cups at a lower manufacturing cost than conventional retainer straps. Also, the retainer straps of the invention are stronger than conventional retainer straps.

In a preferred embodiment of the invention, the radius of curvature of the curved outside surface is within the range of from about 1.1 to about 1.7 times the radius of the curved inside retainer surface, and preferably within the range of from about 1.3 to about 1.5 times the radius of the curved inside retainer surface.

In a specific embodiment of the invention, the retainer strap is a formed element, rather than a stamped part.

In another embodiment of the invention, each end portion of the retainer strap is provided with a recessed area to enable fasteners, such as the bolts, to be recessed from the curved outside surface. Also, the retainer strap preferably has lateral side surfaces in the end portions which extend substantially to the ends of the retainer strap.

DETAILED DESCRIPTION OF THE PREFERRED EMBODIMENT

Figure 1:
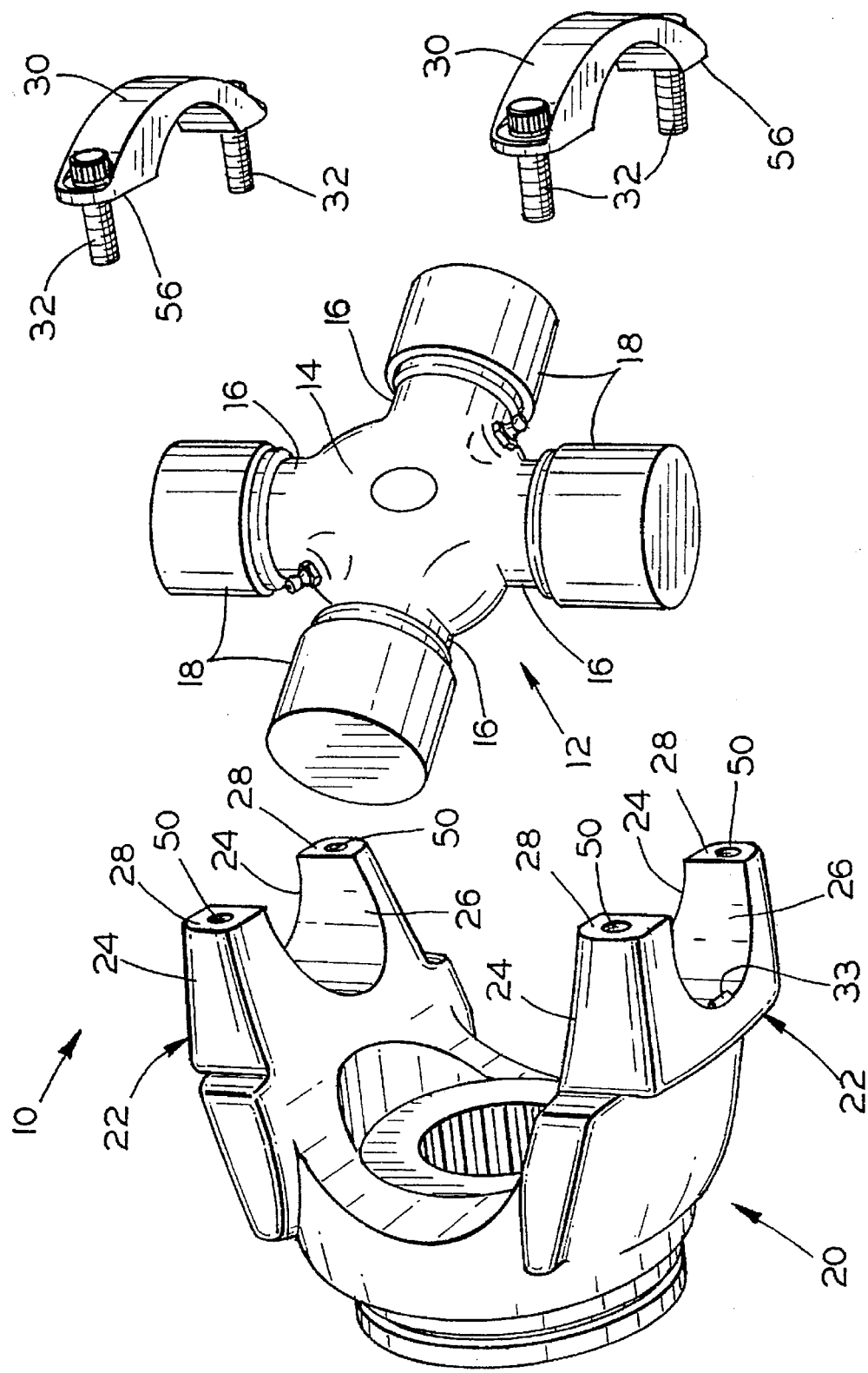
FIG. 1 is an exploded view in perspective of a universal joint including a yoke, a cross, and two retainer straps.

Referring now to the drawings, there is illustrated in FIG. 1 a universal joint assembly, indicated generally at 10. The universal joint 10 includes a cross member, indicated generally at 12. The cross 12 includes a central body portion 14. The cross member further includes four cylindrical trunnions 16. The trunnions extend radially outwardly from the body portion 14 in a common plane at right angles relative to one another. Bearing cups 18 are mounted on the end of each of a pair of opposed trunnions. Needle bearings, not shown, are disposed between the inner bearing surface of the bearing cups and the outer bearing surface of the trunnions. It is to be understood that any suitable bearing can be used to provide a reduced friction rotational connection between the bearing cup and the trunnions. Each of the bearing cups is formed generally in the shape of a hollow cylinder.

The universal joint 10 illustrated in FIG. 1 further includes a half round end yoke, indicated generally at 20. The end yoke includes a pair of opposed arms 22, each of which is provided with a pair of legs 24. The arms 22 have curved yoke surfaces 26 which are, in part, defined by the legs 24. The yoke surfaces 26 are shaped to accurately fit the shape of the bearing cups 18 so that the bearing cups can be tightly retained without rotation during rotation of the universal joint. The legs have a flat surfaces, yoke faces 28, for mating with the retainer strap. When the cross member 12 is assembled with the end yoke 20, the opposed bearing cups 18 are positioned in intimate contact with the yoke surfaces 26. The complete universal joint 10 includes another yoke, not shown, which cooperates with the yoke 26 to transfer torque. The design and assembly of universal joints thus far described are well known to those skilled in the art.

Figure 2:
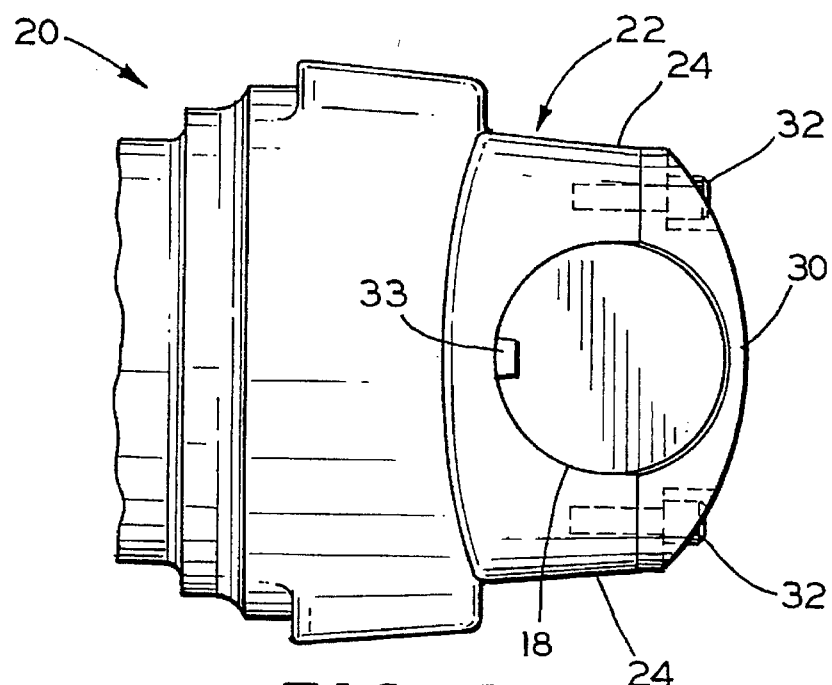
FIG. 2 is a plan view of the universal joint shown in FIG. 1, shown assembled.

Retainer strap 30 is provided to hold the cross member 12 in place within the universal joint by clamping the bearing cups into the yoke surfaces 26. As shown in FIG. 2, the retainer strap is held in place by bolts 32. Any suitable fastener can be used. The arm 22 can be provided with a tang 33 which overhangs the yoke surface 26 and prevents axial movement of the bearing cup.

Figures 3, 4, 5:
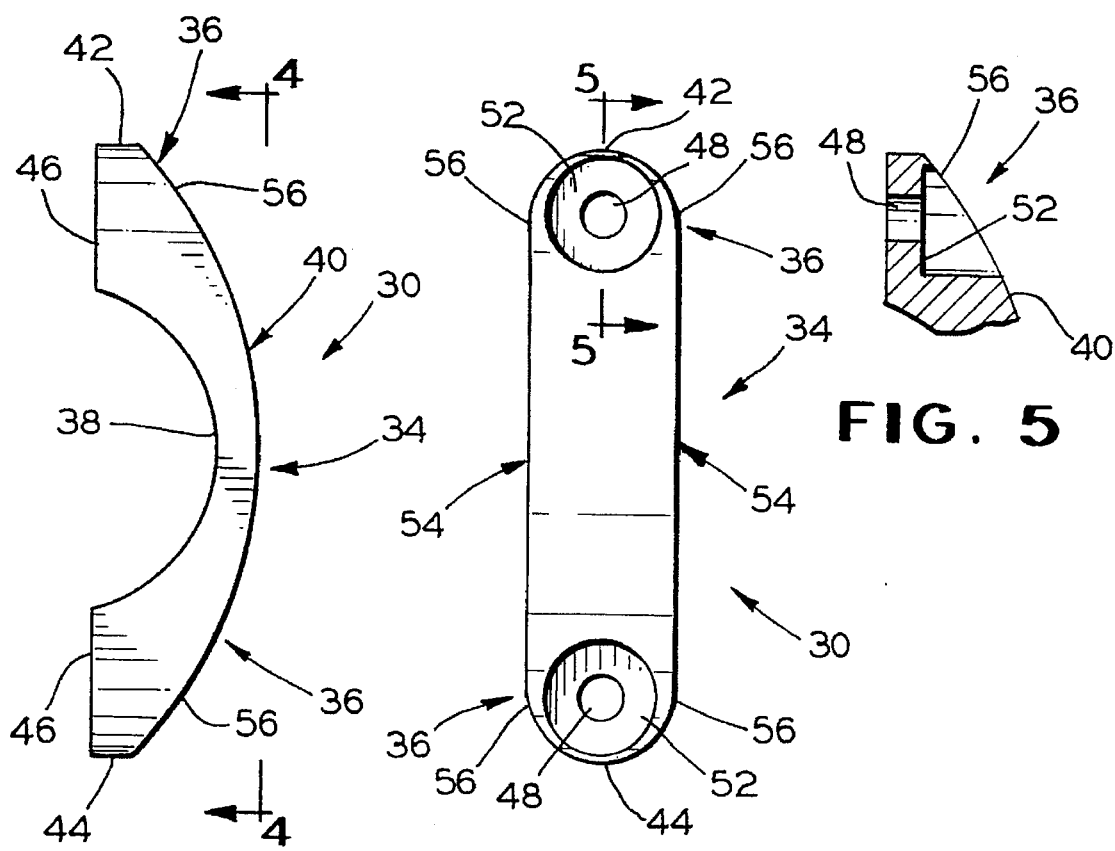
FIG. 3 is a view in elevation of the retainer strap shown in FIG. 1.
FIG. 4 is a plan view of the retainer strap taken along line 4—4 of FIG. 3.
FIG. 5 is a plan view in cross-section of the end portion of the retainer strap, taken along line 5—5 of FIG. 4.

As shown in FIG. 3, the retainer strap 30 is comprised of a central portion or main body portion 34 and two end portions 36. The main body portion 34 has a curved inside retainer surface 38 positioned between the retainer strap end portions 36. The curved inside retainer surface 38 is adapted to conform to the shape of the bearing cup and to cooperate with the yoke surface 26 to form an opening the same size as the bearing cup. The retainer strap 30 is also provided with a curved outside surface 40 which extends from one end 42 of the retainer strip to the other end 44. For ease of manufacture, the shape of the curved outside surface 40 is preferably a continuous arc of a circle, although other shapes can be used. Likewise, the shape of the curved inside retainer surface is preferably a continuous arc of a circle. In a preferred embodiment of the invention, the radius of curvature of the curved outside surface is within the range of from about 1.1 to about 1.7 times the radius of the curved inside retainer surface, and more preferably within the range of from about 1.3 to about 1.5 times the radius of the curved inside retainer surface.

The retainer strap has two retainer faces 46 which mate with the corresponding yoke faces 28 when the retainer strap in bolted in place. As shown in FIGS. 4 and 5, the retainer strap is provided with bolt holes 48 which enable the bolts to extend through the retainer strap and into threaded bolt holes 50 in the yoke faces 28. The bolt holes are positioned within a recessed area 52 which is formed in the end portions 36. The recessed areas are generally cylindrical, but can be slightly downwardly inwardly tapered to ease manufacturing. The recessed areas 52 partially enclose or shield the bolts, as shown in FIGS. 1 and 2, and enable the bolts to be somewhat recessed from the curved outside surface 40.

Since the recessed areas 52 are generally cylindrical in shape, the lateral side surfaces 54 of the retainer strap 30 have end surface portions or end collars 56 which extend substantially to the ends 42, 44 of the retainer strap. Thus, at each end of the retainer strip the curved outside surface 40 terminates in the form of the two end collars 56. The raised portion of the end collars provides more reinforcement than would be provided if the end portion 36 of the retainer strap were flat and thin as in conventional retainer strap designs. The end collars are also shown in FIG. 1.

The retainer strap is preferably a formed element which is subjected to a cold forming process to set the final dimensions, thereby eliminating the necessity of machining the retainer strap. Any suitable material can be used, but a preferred material is 1008 fine grain steel. The term "formed element" means that the element is pushed or shaped into its final form without the loss of any material, rather than being machined, turned or milled, which would involve the removal of material to obtain the final form. Since a formed element does not require a machining process, the formed element is less costly to manufacture. The cold forming process involves pressing or punching a workpiece into a die. The cold forming die is made of die steel. Forcing the relatively soft fine grained steel with a single die stroke into the die forms and smoothes the retainer strap into the desired shape.

It will be evident from the foregoing that various modifications can be made to this invention. Such, however are considered as being within the scope of the invention.

What is claimed is:

1. A yoke and retainer assembly for a universal joint comprising:

a yoke including a body having an arm extending therefrom, said arm having a curved surface formed therein which defines a pair of spaced apart yoke faces, each of said yoke faces having a threaded bore formed therein;

a retainer strap having a first end, a second end, an inner surface extending from said first end to said second end, and an outer surface extending from said first end to said second end, said inner surface including first and second retainer faces extending respectively from said first and second ends and a curved inside surface extending from said first retainer face to said second retainer face, said outer surface including a smoothly and continuously curved outside surface extending from said first end to said second end, said retainer strap having a first hole formed therethrough which extends from said first retainer face to a first recessed area formed in said outside surface and a second hole formed therethrough which extends from said second retainer face to a second recessed area formed in said outside surface, said first and second retainer faces of said retainer strap abutting said yoke faces of said yoke arm, said curved inside surface of said retainer strap being aligned with said curved surface of said yoke arm, said first and second holes formed through said retainer strap being aligned with said threaded bores formed in said yoke arm; and first and second threaded fasteners including head portions respectively received within said first and second recessed areas formed in said curved outside surface of said retainer strap and threaded shank portions extending respectively through said first and second holes formed through said retainer strap into cooperation with said threaded bores formed in said yoke arm so as to secure said retainer strap to said yoke.

2. The yoke and retainer assembly defined in claim 1 wherein said curved inside surface of said retainer strap defines a first radius of curvature, said curved outside surface of said retainer strap defines a second radius of curvature, and said second radius of curvature is within the range of from about 1.1 to about 1.7 times of said first radius of curvature.

3. The yoke and retainer assembly defined in claim 1 wherein said first and second recessed areas formed in said curved outside surface of said retainer strap are generally cylindrical in shape.

4. The yoke and retainer assembly defined in claim 1 wherein said retainer strap includes lateral side surfaces which extend substantially between said first and second ends of said retainer strap.

5. A universal joint assembly comprising:

a cross including a body portion having a plurality of trunnions extending outwardly therefrom;

a bearing cup rotatably mounted on each of said trunnions;

a yoke including a body having a pair of arms extending therefrom, each of said arms having a curved surface formed therein which defines a pair of spaced apart yoke faces, each of said yoke faces having a threaded bore formed therein, a bearing cup being received within each of said curved surfaces of said yoke arms;

a retainer strap secured to each of said yoke arms for retaining said bearing cups therein, each of said retainer straps having a first end, a second end, an inner surface extending from said first end to said second end, and an outer surface extending from said first end to said second end, said inner surfaces including first and second retainer faces extending respectively from said first and second ends and a curved inside surface extending from said first retainer face to said second retainer face, said outer surfaces including a smoothly and continuously curved outside surface extending from said first end to said second end, each of said retainer straps having a first hole formed therethrough which extends from said first retainer face to a first recessed area formed in said outside surface and a second hole formed therethrough which extends from said second retainer face to a second recessed area formed in said outside surface, said first and second retainer faces of each of said retainer straps abutting said yoke faces of said yoke arm, said curved inside surfaces of said retainer straps being aligned with said curved surfaces of said yoke arms so as retain said bearing cups therein, said first and second holes formed through each of said retainer straps being aligned with said threaded bores formed in said yoke arms;

first and second threaded fasteners including head portions respectively received within each of said first and second recessed areas formed in said curved outside surfaces of said retainer straps and threaded shank portions extending respectively through each of said first and second holes formed through said retainer straps into cooperation with said threaded bores formed in said yoke arms so as to secure said retainer straps to said yokes.

6. The universal joint assembly defined in claim 5 wherein said curved inside surface of each of said retainer straps defines a first radius of curvature, said curved outside surface of each of said retainer straps defines a second radius of curvature, and said second radius of curvature is within the range of from about 1.1 to about 1.7 times of said first radius of curvature.

7. The yoke and retainer assembly defined in claim 5 wherein said first and second recessed areas formed in said curved outside surface of each of said retainer straps are generally cylindrical in shape.

8. The yoke and retainer assembly defined in claim 5 wherein each of said retainer straps includes lateral side surfaces which extend substantially between said first and second ends of said retainer strap.

* * * * *